United States Patent
Takahashi et al.

(10) Patent No.: US 9,267,431 B2
(45) Date of Patent: Feb. 23, 2016

(54) POSITION REGULATING APPARATUS FOR ENGINE OPERATING MACHINE

(71) Applicant: HONDA MOTOR CO., LTD., Tokyo (JP)

(72) Inventors: Yuuki Takahashi, Wako (JP); Takeshi Sasajima, Wako (JP); Katsuhiro Nakagawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 224 days.

(21) Appl. No.: 13/655,900

(22) Filed: Oct. 19, 2012

(65) Prior Publication Data

US 2013/0099088 A1 Apr. 25, 2013

(30) Foreign Application Priority Data

Oct. 21, 2011 (JP) .................. 2011-231736

(51) Int. Cl.

| | |
|---|---|
| *F16M 1/00* | (2006.01) |
| *F16M 3/00* | (2006.01) |
| *F16M 5/00* | (2006.01) |
| *F16M 7/00* | (2006.01) |
| *F16M 9/00* | (2006.01) |
| *F16M 11/00* | (2006.01) |
| *F02B 63/04* | (2006.01) |
| *F02B 63/00* | (2006.01) |
| *F02B 43/08* | (2006.01) |
| *H02K 7/18* | (2006.01) |

(52) U.S. Cl.
CPC ............... *F02B 63/04* (2013.01); *F02B 63/044* (2013.01); *F02B 63/048* (2013.01); *F02B 2063/045* (2013.01); *F16M 3/00* (2013.01); *F16M 5/00* (2013.01); *F16M 7/00* (2013.01); *F16M 9/00* (2013.01); *F16M 11/00* (2013.01)

(58) Field of Classification Search
CPC ..................... B60G 2204/15; B60G 2204/143; B60G 2204/421; B60G 2206/60; B60K 5/1216; B60K 5/1208; B60K 5/12; B60K 5/1241; B62D 21/11; F02B 63/00; F02B 63/04; F02B 63/048; F02B 2063/045
USPC ................. 248/612, 637, 646, 672, 676, 678; 290/1 A; 180/299, 312
See application file for complete search history.

(56) References Cited

U.S. PATENT DOCUMENTS 1,752,809 A * 4/1930 Riordan .................. 180/292
3,762,671 A * 10/1973 Schulz .................. 267/140.2

(Continued)

FOREIGN PATENT DOCUMENTS

| JP | 6-081897 | 3/1994 |
|---|---|---|
| JP | 3065007 | 10/1999 |

*Primary Examiner* — Syed A Islam
*Assistant Examiner* — Taylor Morris
(74) *Attorney, Agent, or Firm* — Rankin, Hill & Clark LLP (57) ABSTRACT

A position regulating apparatus has a generator body made of an engine and a generator driven by the engine, and a frame surrounding the periphery of the generator body. The frame is provided with a bump stopper as a rod member. The bump stopper is attached to a housing of the engine and disposed horizontally. The bump stopper regulates the position in the horizontal direction of the generator body within a preset range. Receiving plates disposed so as to face both end faces of the stopper body are provided. The round bar as the body of the bump stopper has a crank shape which reduces an impact by generating bending moment.

15 Claims, 7 Drawing Sheets

(56) References Cited

U.S. PATENT DOCUMENTS

| | | | |
|---|---|---|---|
| 4,548,164 A * | 10/1985 | Ylonen et al. | 123/2 |
| 4,850,448 A * | 7/1989 | Stephens | 180/299 |
| 4,961,403 A * | 10/1990 | Kawaguchi et al. | 123/2 |
| 5,385,217 A * | 1/1995 | Watanabe et al. | 188/267 |
| 5,851,007 A * | 12/1998 | Swartzlander et al. | 269/17 |
| 6,003,829 A * | 12/1999 | Martinsson | 248/675 |
| 6,103,995 A * | 8/2000 | Bankstahl | 219/133 |
| 6,374,939 B1 * | 4/2002 | Hohnstadt et al. | 180/299 |
| 6,408,974 B1 * | 6/2002 | Viduya et al. | 180/312 |
| 7,673,589 B2 * | 3/2010 | Shimada et al. | 123/2 |
| 2003/0071463 A1 * | 4/2003 | Takizawa et al. | 290/1 A |
| 2007/0213153 A1 * | 9/2007 | Stone | 474/133 |
| 2009/0229544 A1 * | 9/2009 | Hatsugai et al. | 123/41.56 |
| 2009/0263259 A1 * | 10/2009 | Picton et al. | 417/364 |
| 2010/0264669 A1 * | 10/2010 | Peacock et al. | 290/1 R |

* cited by examiner

PRIOR ART

POSITION REGULATING APPARATUS FOR ENGINE OPERATING MACHINE

TECHNICAL FIELD

The present invention relates to a regulating position apparatus for an engine operating machine and, more particularly, relates to a position regulating apparatus for an engine operating machine having a structure suitable for flexibly addressing to a change or a modification in strength of each of members of the position regulating apparatus and the clearance with a frame member surrounding the operating machine.

BACKGROUND ART

An operating machine driven by an engine, such as an engine generator (in the following description, typified as "engine generator") is provided with buffer means so that an impact of external force is not directly transmitted from an external frame to the body of the engine generator or, reversibly, vibration of the engine is not transmitted to the external frame.

For example, Japanese Unexamined Patent Application Publication No. 06-81897 discloses a device for mounting a generator, provided in such a manner that an elastic member such as rubber is interposed between a frame-side plate and a generator-side plate and a pin projected from the generator-side plate is positioned between a pair of stoppers provided for the frame-side plate. In the mount device, in the case where external force acts on the generator, it is buffered by the elastic member, and the pin comes into contact with the stoppers to regulate the motion of the generator.

Japanese Utility Model Registration No. 3,065,007 discloses an engine generator having a generator base and a common base supporting a generator and an engine, and having a structure that the generator base and the common base are loosely fit while interposing a vibration-proof rubber between the bases. In the engine generator, the generator base and the common base are attached with a sufficient space therebetween so that the generator base and the common base do not come into contact with each other and become a noise source when the engine vibrates.

A mount device with buffer means or an elastic member as described in Japanese Unexamined Patent Application Publication No. 06-81897 and Japanese Utility Model Registration No. 3,065,007 mainly functions as a member of fixedly supporting a lower part of an engine generator to a base member or a frame. In addition, in some cases, using a position regulating plate as a metal plate provided for an upper part of the engine generator (hereinbelow, called "bump stopper"), a shake of the upper part is regulated. Generally, the engine generator is surrounded by an external frame. For example, there is a case that the engine generator shakes in a shake width larger than that in normal operation due to vibration of a transport vehicle during transportation, shake of a transportation crane, or the like. Consequently, to prevent a part of the engine generator from being come off from the external frame to the outside, a bump stopper is provided. When the engine generator largely shakes, the bump stopper comes into contact with the external frame to regulate the position so that the engine generator does not come off from the external frame to the outside.

The gap between the bump stopper and the external frame of the engine generator is set so that, when the external frame is subjected to impact from the outside, the bump stopper comes into contact with the external frame faster than the other members. With the configuration, avoiding direct contact of the engine generator body with the external frame, the engine generator is protected.

Figure 8:
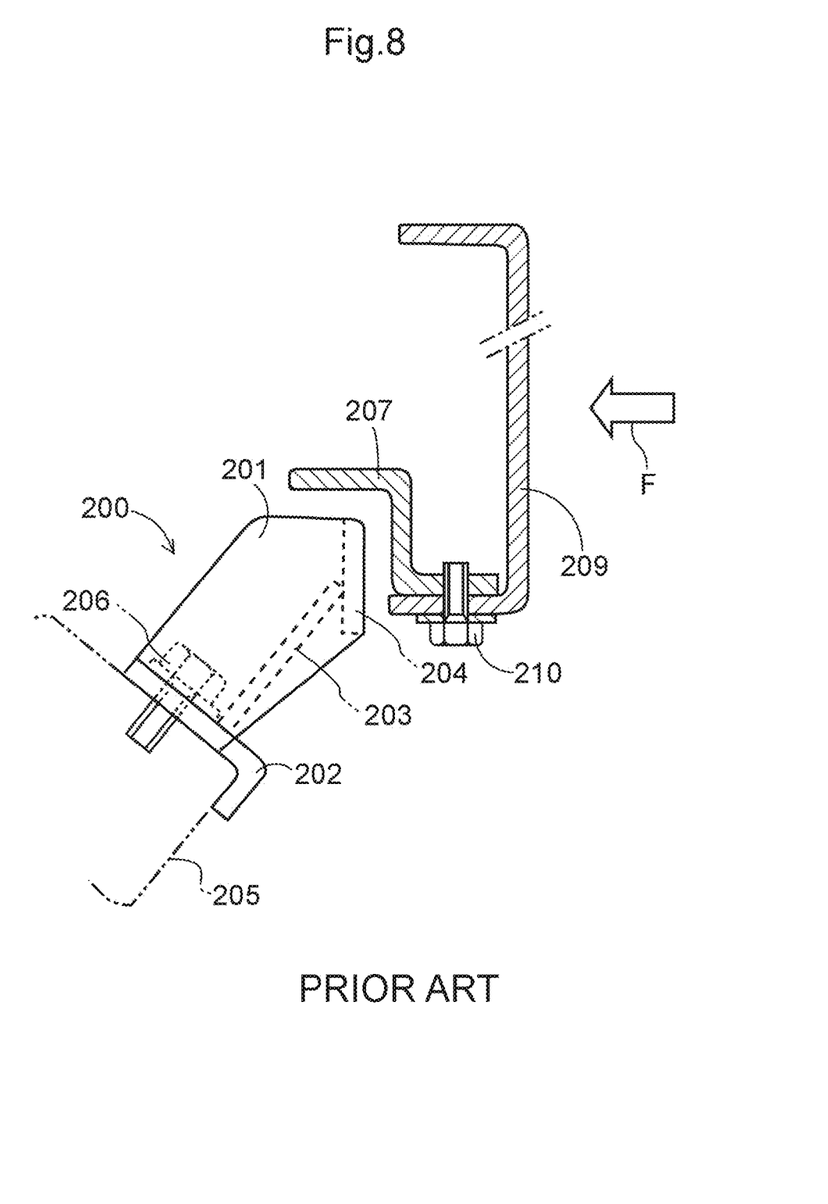
FIG. 8 is a diagram showing an example of a conventional position regulating apparatus using a bump stopper.

FIG. 8 is a diagram showing an example of a conventional position regulating apparatus using a bump stopper. In FIG. 8, a bump stopper 200 is a piece of a metal plate (for example, a steel plate) and has a main part 201 and reinforcement members 202, 203, and 204 orthogonal to the main part 201. In this example, the reinforcement member 202 is an attachment part whose sectional shape is an L shape suited to attach the bump stopper 200 to an engine 205. The bump stopper 200 is fixed to the engine 205 using a bolt 206 passed through the attachment part 202. The reinforcement member 204 of the bump stopper 200 is disposed in a position opposed to a bracket 207, and the bracket 207 is attached to a horizontal part of a beam 209 as a part of an external frame of an engine generator with a bolt 210 penetrated from below.

With the bump stopper 200 of FIG. 8, in the case where the engine generator vibrates vertically or horizontally in the diagram or in the case such that the beam 209 is deformed by application of an external force F, the tip of the bump stopper 200, that is, the reinforcement member 204 side of the bump comes into contact with the bracket 207, so that the external force transmitted from the beam 209 is not directly transmitted to the engine 205. Since the bump stopper 200 comes into contact with the beam 209, even when vibration having large amplitude is applied, a movable part of the engine generator is prevented from being come off from the external frame to the outside.

CITATION LIST

Patent Literature

Patent Literature 1 Japanese unexamined Patent Application No. 06-81897
Patent Literature 2 Japanese Utility Model Registration No. 3,065,007

SUMMARY OF INVENTION

Technical Problem

Each time the specification of an engine or accessories is slightly changed, the shape, layout, and the like of a bump stopper have to be changed. For example, there is a case such that, to assure necessary clearance with a member (the bracket 207) on the frame side corresponding to the bump stopper or to assure strength of the bracket, a large change in the thickness, shape, layout, or the like of the bump stopper is requested. In the case where such a change occurs at almost the end of product development, that is, at almost the start of mass production, it is difficult to immediately change the shape of the bump stopper and the frame facing the stopper. It causes problems such as delay in product development schedule or cost increase.

In view of the problems, an object of the present invention is to provide a position regulating apparatus for an engine operating machine, which does not require a large design change in thickness, shape, layout, or the like of a related member for a slight change in an engine or accessories.

Solution to Problem

The first feature of the present invention to accomplish aforementioned object is a position regulating apparatus for an engine operating machine that provides an operating machine body including an engine, an operating machine driven by the engine, and an external frame surrounding the periphery of the operating machine body, comprising a rod member attached to the operating machine body and disposed so that its ends project from the periphery of the operating machine body; and receiving plates of the rod member, provided for the external frame and, to regulate position in the horizontal direction of the operating machine body in a preset range, disposed so as to face both end faces of the rod member with an interval corresponding to the range, wherein the rod member has a crank shape having bent parts provided in positions deviated to the both ends from the center.

The second feature of the present invention is that the receiving plate has a vertical part opposed to an end face of the rod member and horizontal parts and orthogonal to the vertical part.

The third feature of the present invention is that the operating machine is the generator driven by the engine, and the rod member is fixed to an engine block of the engine.

The fourth feature of the present invention is that the operating machine further comprising stays joined to the rod member, wherein the engine block of the engine is provided with bosses and, by coupling the stays to the bosses, the rod member is fixed to the engine.

Advantageous Effects of Invention

According to the present invention having the above-described characteristics, when an engine operating machine receives large external force and the machine body shakes, the end of a rod member collides with a receiving plate so that a change in the position of the operating machine body is regulated. Particularly, since the rod member has bent parts, when the end of the rod member collides with the receiving plate, the bending moment acts on the rod member, and the energy of the collision is absorbed and reduced. Only by changing the procedure of bending process of forming the bent parts in the rod member, a change in the strength of the rod member can be addressed. Therefore, for example, a change just before mass production of the engine operating machine is addressed, and the shape of the rod member can be easily changed.

According to the present invention having the second characteristic, the end of the rod member comes into contact with a vertical member of a receiving plate in which relatively large area can be assured. Consequently, while addressing a displacement in the vertical and longitudinal directions of the operating machine body, the position regulation in the horizontal direction can be performed reliably.

According to the present invention having the third characteristic, also in the case of attaching the rod member to the housing of the engine, the rod member absorbs and reduces the collision energy by the bent parts. Therefore, while avoiding damage in the housing of the engine, the position regulation can be performed.

According to the present invention having the fourth characteristic, by joining stays to the rod member, the flexibility of selecting the attachment position of the rod member to the peripheral face of the housing can be increased. Therefore, for example, using an existing boss which is not used, the rod member can be attached to the engine.

DESCRIPTION OF EMBODIMENTS

Figure 1:
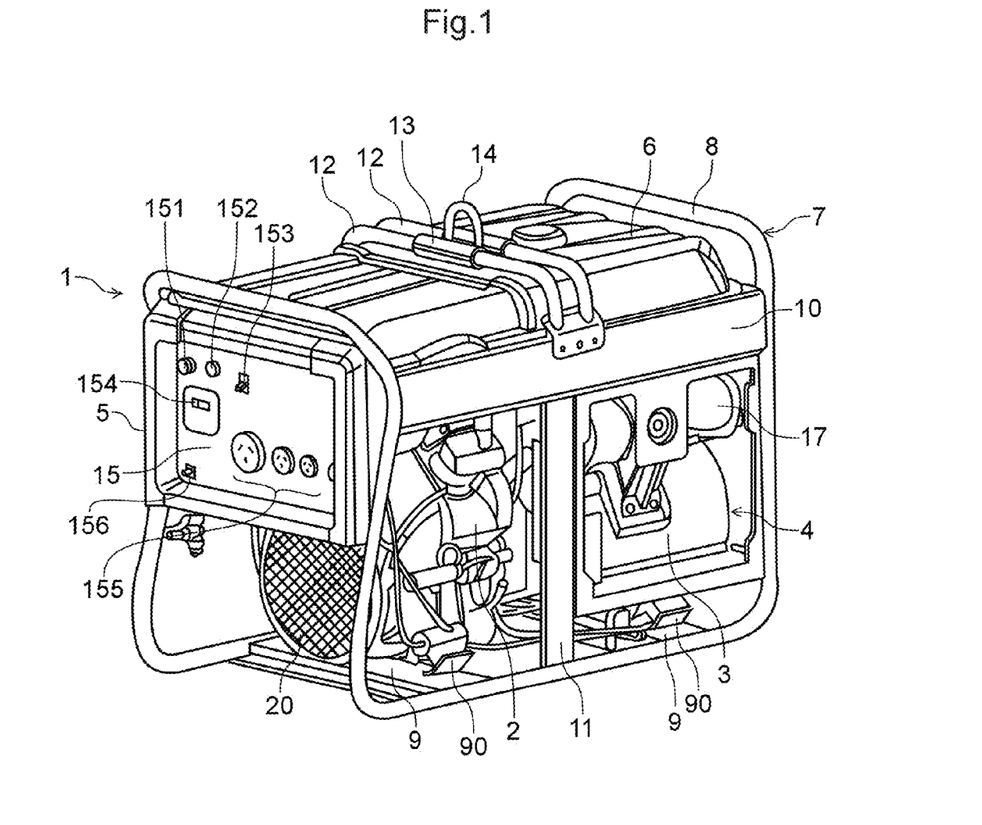
FIG. 1 is an oblique perspective figure viewing from a front left side of the engine generator having a bump stopper according to the one embodiment of the present invention.
Figure 2:
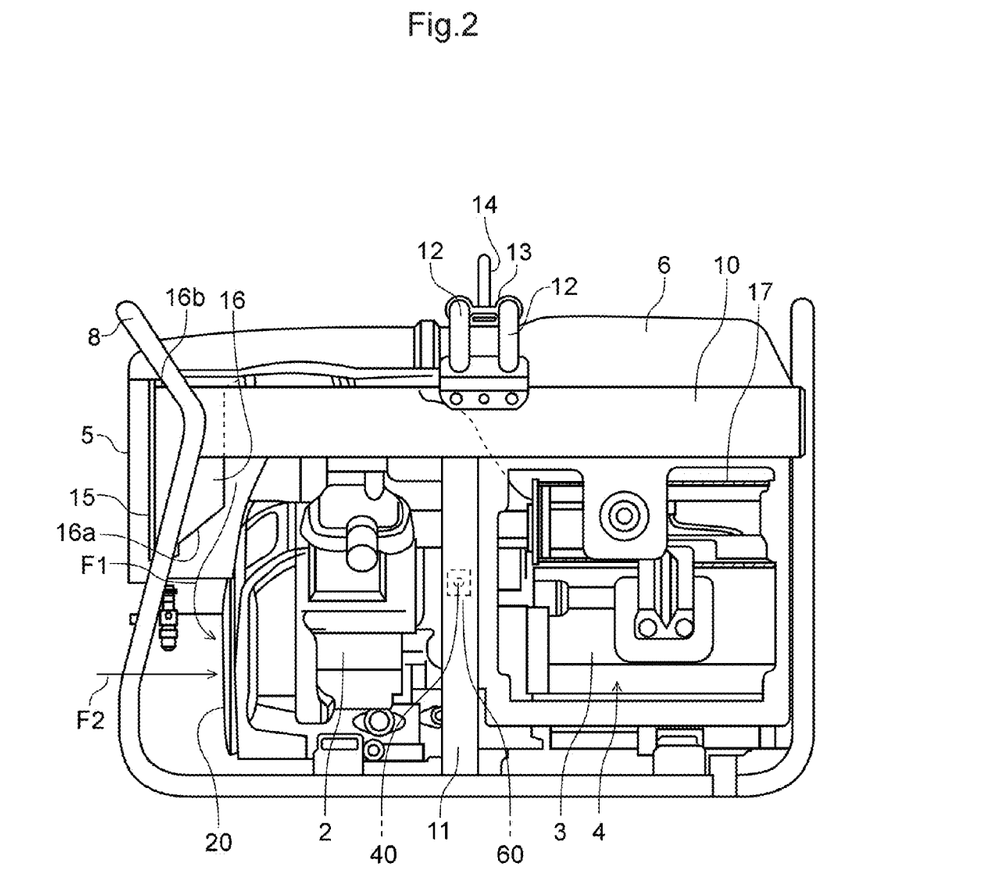
FIG. 2 is a left side elevation view of the engine generator having a bump stopper according to the one embodiment of the present invention.

Hereinafter, an embodiment of the present invention will be described with reference to the drawings. FIG. 1 is a perspective view of an engine generator having a position regulating apparatus according to the embodiment of the present invention. FIG. 2 is a side view of the engine generator. In FIGS. 1 and 2, an engine generator 1 has a generator body 4 made by an engine 2 and a generator 3 driven by the engine 2. In the specification, the side on which the engine 2 is disposed is called a front side of the engine generator 1, and the side on which the generator 3 is disposed is called a rear side of the engine generator 1.

An external frame 7 surrounding the generator body 4 includes a main frame 8 made of steel pipe, lower beams 9 coupling lower right and left ends forked in the main frame 8, two upper beams 10 coupling upper parts of the main frame 8 in the longitudinal direction, and perpendicular beams 11 each downwardly extending from a midpoint in the longitudinal direction of the upper beam 10 and joined to the lower part of the main frame 8. The two lower beams 9 are provided at an interval in the longitudinal direction, a pair of upper beams 10 are provided so that one upper beam 10 is provided on the right side and the other upper beam 10 is provided on the left side, and a pair of perpendicular beams 11 are provided so that one perpendicular beam 11 is provided on the right side and the other perpendicular beam 11 is provided on the left side. Although only the upper beam 10 and the perpendicular beam 11 positioned on the left side of the generator body 4 are shown, the upper beam 10 and the perpendicular beam 11 on the right side are also provided in similar positions. To each of the perpendicular beams 11, a bump stopper receiver 60 disposed in the position opposed to a bump stopper 40 is joined as a part of a position regulating apparatus which suppresses a large shake in the horizontal direction of the generator body 4. The details of the bump stopper 40 and the bump stopper receiver 60 will be described later.

A fuel tank 6 is formed so as to widely cover the entire upper part of the generator body 4, assures large capacity, and also acts as a generator body cover which suppresses falling of water and dust from above to the generator body 4. Two lateral pipes 12 whose both ends are coupled to the right and left upper beams 10 are provided in the lateral direction over the fuel bank 6. The two lateral pipes 12 are coupled to each other by a bracket 13, and a ring 14 is joined to the bracket 13.

There is provided a muffler 17 coupled to an exhaust pipe led between the engine 2 and the generator 3 and extending in the longitudinal direction above the left side of the generator 3. The generator body 4 is mounted in the external frame 7 by mount devices 90 with buffer members fixed in four places of front, rear, right, and left places on the lower beams 9 and 9. The mount device 90 has a buffer member (made of, for example, rubber) so that the generator body 4 can displace within a predetermined range in the horizontal and vertical directions, and can absorb vibrations accompanying operation. As the mount device 90, a known mount device as described in Japanese Unexamined Patent Application Publication No. Hei 6-81897 can be used.

The engine 2 is an air-cooled four-cycle engine and is cooled by outside air taken from an air intake port 20 provided on the front side of the engine 2. On the rear side or the back side of the air intake port 20, a fan (not shown) which is coupled to the engine 2 and rotated is provided. By the rotation of the fan, flows F1 and F2 of air taken in the engine 2 are generated.

An operation box 5 for operating the working of the engine generator 1 is provided adjacent to the engine 2 and above the front side of the air intake port 20, and the fuel tank 6 is provided behind the operation box 5. The operation box 5 has an operation panel 15 and a case 16 existing on the back side of the operation panel 15 and housing parts for various controls including an automatic voltage regulator (AVR) and electric wires. In the operation panel 15, a choke button 151, an engine switch 152, a breaker switch 153, a liquid crystal monitor 154, a plurality of outlets 155, an earth terminal 156, and the like are disposed.

Since particularly the flow F1 in the air flows F1 and F2 is along the case 16 of the operation box 5, the pressure in the outer periphery of the case 16, particularly, around the lower part is lower than that in the upper part of the case 16 where there is no flow of air. Therefore, by providing an opening in each of an under face 16a and an upper part 16b of the case 16, flow of air exhausted from the opening of the lower part of the case 16 to the outside is generated and, accompanying the flow of air, fresh air is taken from the opening in the upper part to the inside of the case 16. Such a flow of air is continued during the operation of the engine 2, and the inside of the case 16 of the operation box 5 is forcibly cooled by air.

Particularly, the under face 16a of the case 16 is disposed not perpendicular to the vertical face forming the operation panel 15 but as a tilted face whose front side is low and whose rear side is high so as to obliquely face the air intake port 20. Consequently, the flow rate of the air F1 flowing along the under face 16a increases, and the pressure difference between the periphery of the lower part of the case 16 and the upper part of the case 16 can be further increased.

Figure 3:
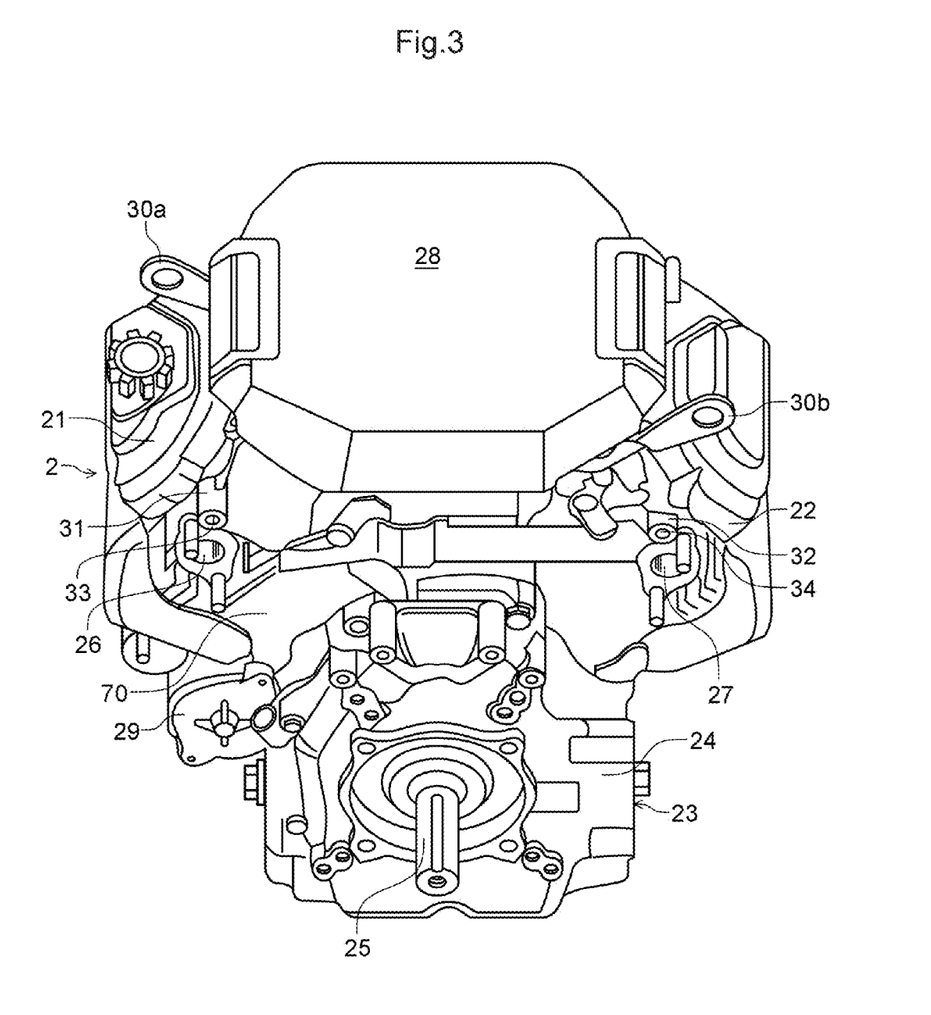
FIG. 3 is a rearward perspective view of the engine.

FIG. 3 is a rearward perspective view of the engine 2. The engine 2 is a V-type twin engine in which two cylinders 21 and 22 are disposed with a predetermined bank angle, and has a crankcase 23 supporting a crankshaft having a not-shown crank part below the cylinders 21 and 22. From a rear face 24 (on the generator 3 side) of the crankcase 23, an output shaft 25 extending from the crankshaft is projected. On the rear side of the cylinders 21 and 22, exhaust ports 26 and 27 communicated with combustion chambers of the cylinders 21 and 22 are provided. Not-shown exhaust pipes coupled to the exhaust ports 26 and 27 are coupled to the muffler 17 (refer to FIG. 1).

An air cleaner 28 is provided above the cylinders 21 and 22, and not-shown intake pipes for sending air to the cylinders 21 and 22 are provided on the front side of the air cleaner 28. The engine 2 is of an electric starter type, and a starter motor 29 is disposed on the side of the crankcase 23. Rings 30a and 30b used at the time of carrying the engine 2 are coupled to the upper part of the cylinders 21 and 22, respectively.

On the rear side of the cylinders 21 and 22, of the case of the engine 2 or the engine block 70, bosses 31 and 32 projected rearward in the horizontal direction are provided adjacent to the exhaust ports 26 and 27, respectively. Screw holes 33 and 34 are opened in the bosses 31 and 32, respectively. The bosses 31 and 32 having the screw holes 33 and 34, respectively, can be used to attach a bump stopper which will be described later to the bosses 31 and 32 by bolts.

Figure 4:
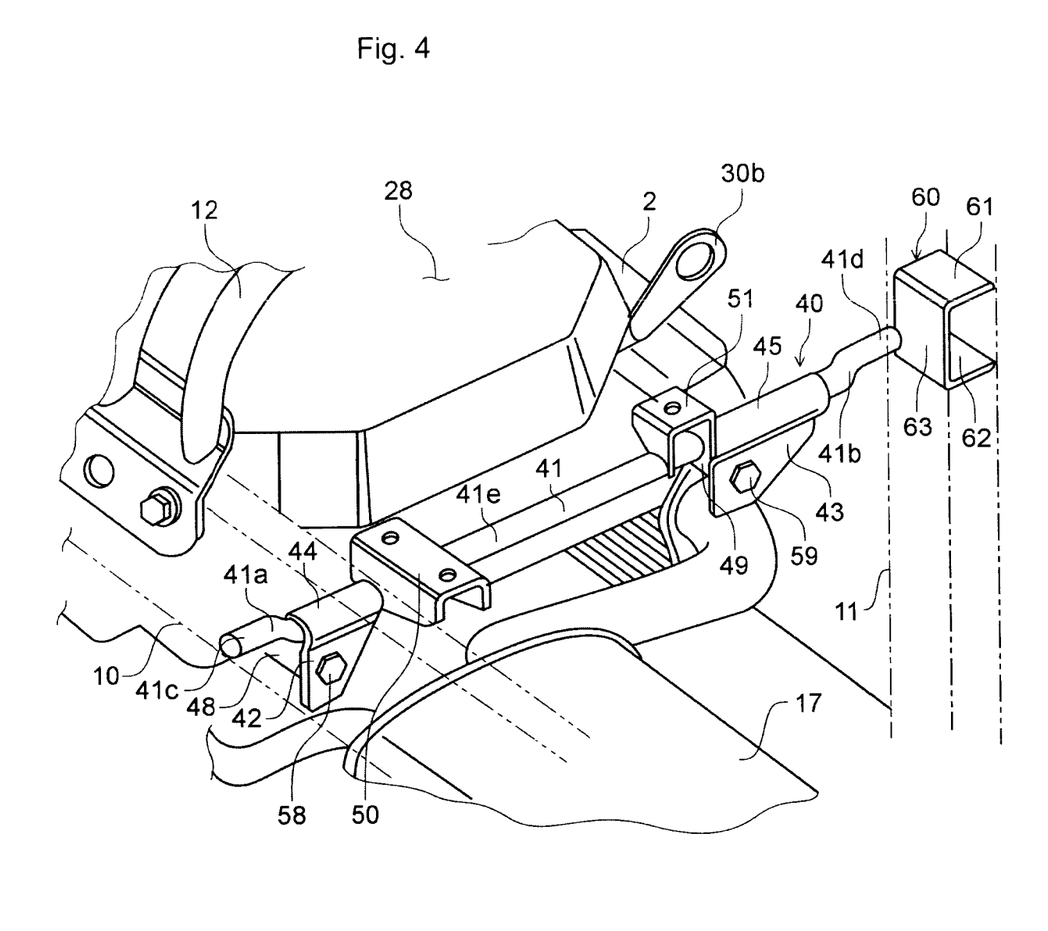
FIG. 4 is an oblique perspective view of a main portion of the engine generator with having the bump stopper.
Figure 5:
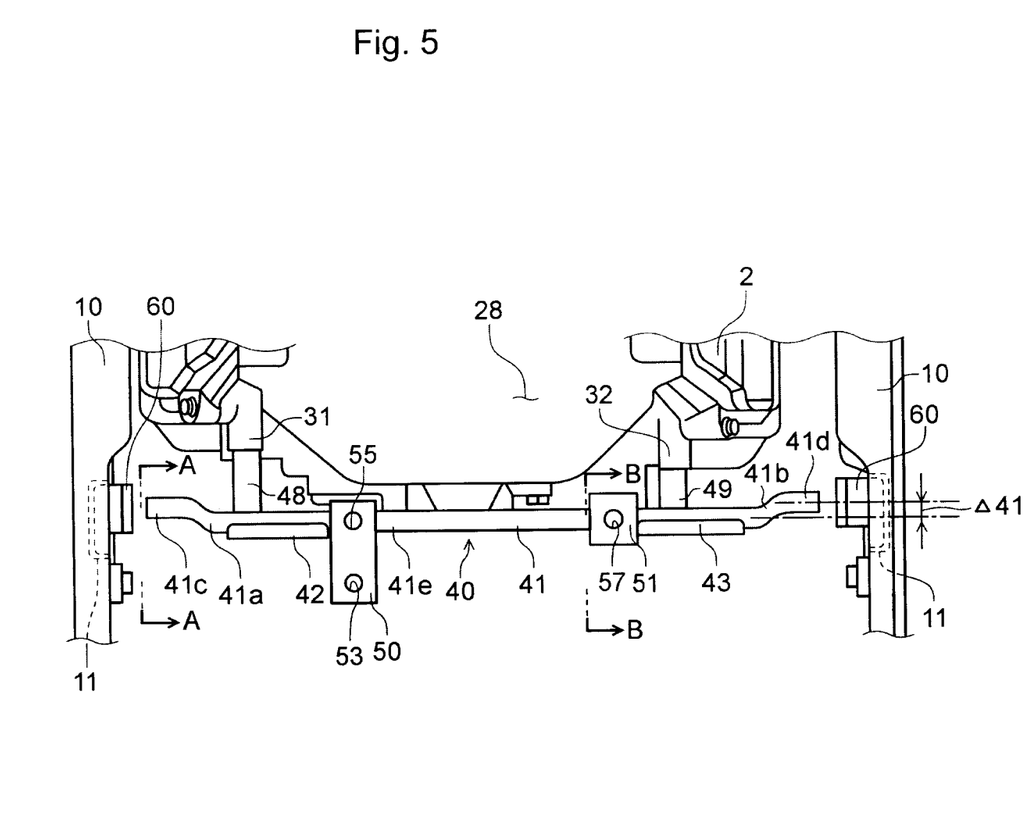
FIG. 5 is a plane view of a main portion of the engine generator with having the bump stopper.
Figure 6:
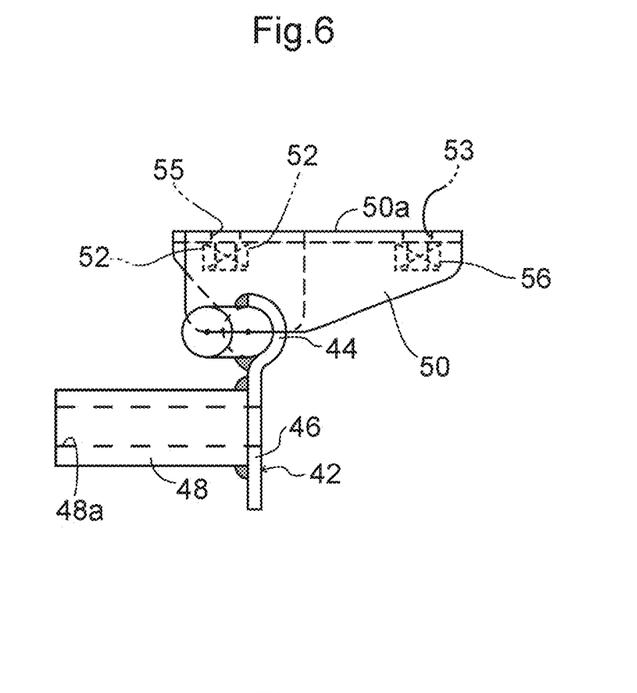
FIG. 6 is a cross section taken along line A-A of FIG. 5.
Figure 7:
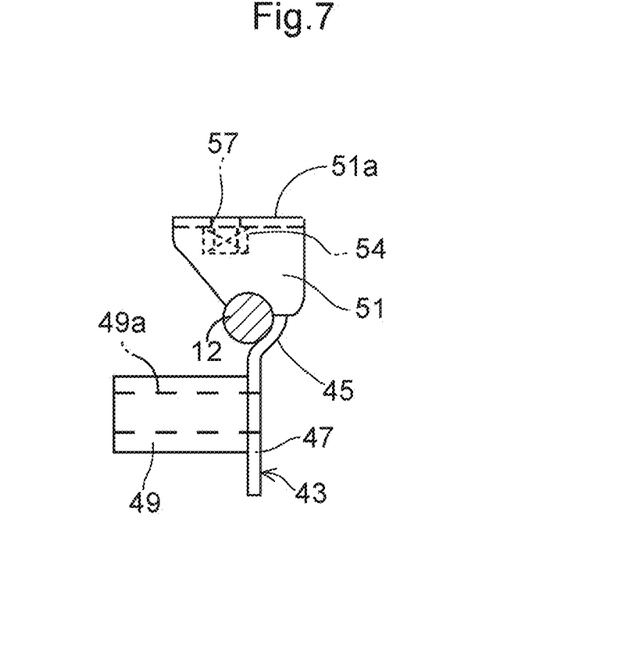
FIG. 7 is a cross section taken along line B-B of FIG. 5.

FIG. 4 is a perspective view of a main part of the engine generator 1 to which a bump stopper is attached seen from rear upper left. FIG. 5 is a plan view of the main part of the engine generator 1. FIG. 6 is a cross section taken along line A-A of FIG. 5. FIG. 7 is a cross section taken along line B-B of FIG. 6. The bump stopper 40 as a position regulating device has a rod-shaped stopper body (for example, a steel round bar having a diameter of 12 mm) 41. The stopper body 41 has bent parts 41a and 41b in two places. End parts 41c and 41d of the bent parts 41a and 41b are parallel to the extension direction of a linear part 41e of the stopper body 41 sandwiched by the bent parts 41a and 41b and are formed in a crank shape so as to be deviated from the axis of the linear part 41e only by a deviation amount Δ41. Both ends of the bump stopper body 40 are projected from the outer peripheral face of the generator body 4 toward the external frame 7 and positioned closer to the outer frame 7 than the other parts of the generator body 4.

To the linear part 41e of the bump stopper body 41, stays 42 and 43 are joined adjacent to the bent parts 41a and 41b. As can be understood from FIG. 6, the stays 42 and 43 are made by attachment parts 44 and 45 curved along the half of the periphery of the stopper body 41 and plane parts 46 and 47 extending from the attachment parts 44 and 45, respectively, so as to be orthogonal to the stopper body 41. Collars 48 and 49 are joined to the plane parts 46 and 47, respectively. The collars 48 and 49 have through holes 48a and 49a, respectively, and are disposed and joined so that the through holes 48a and 49a are orthogonal to the plane parts 46 and 47, respectively. The collar 48 is positioned and joined close to the bent part 41a and more to the left of the plane part 46. The collar 49 is joined close to the bent part 41b and in an almost center position of the plane part 47.

Further, to the linear part 41e of the stopper body 41, brackets 50 and 51 are joined adjacent to the stays 42 and 43, respectively, and more to the center side. The brackets 50 and 51 have horizontal parts 50a and 51a, respectively, extending in the extension direction of the collars 48 and 49. On the face on the stopper body 41 side (under face) of the horizontal parts 50a and 51a, nuts 52 and 56 and a nut 54 are welded, respectively. In the horizontal part 50a, holes 55 and 53 through which not-shown bolts to be screwed in the nuts 52 and 56 are inserted are formed. In the horizontal part 51a, a hole 57 through which a not-shown bolt to be screwed in the nut 54 is inserted is formed.

Preferably, joining of the attachment parts 44 and 45 and the brackets 50 and 51 to the stopper body 41 and joining of the collars 48 and 49 to the plane parts 46 and 47 of the stays 42 and 43 is performed by, for example, welding.

In the bump stopper 40, the bolts 58 and 59 are inserted in the plane parts 46 and 47 of the stays 42 and 43 and the through holes 48a and 49a in the collars 48 and 49 joined to the plane parts 46 and 47, respectively, and the bolts 58 and 59 are screwed in the bosses 31 and 32 formed in the engine 2. In such a manner, the bump stopper 40 is fixedly supported by the engine 2.

The brackets 50 and 51 can be used, for example, to support parts and members disposed above the generator body 4 such as the fuel tank 6.

To the perpendicular beam 11 of the external frame 7, the bump stopper receiver 60 is joined. The bump stopper receiver 60 is made of horizontal parts 61 and 62 and a vertical part 63 and is disposed so that the front face of the vertical part 63 faces end faces of the ends 41c and 41d of the stopper body 41 of the bump stopper 40. That is, the bump stopper receiver 60 and the bump stopper 40 are disposed so that the both ends 41c and 41d of the stopper body 41 come into contact with the facing vertical parts 63 when the generator body 4 largely oscillates to right and left.

The bump stopper receiver 60 is not limited to the shape shown in FIG. 4 but may be any configuration having a vertical part with which an end of the stopper body 41 comes into contact and having horizontal parts crossing the vertical part. For example, like the bracket 207 shown in FIG. 8, a bump stopper receiver having a shape such that horizontal parts extend in the same direction from both ends of the vertical part may be used. A bump stopper receiver having an L shape in section obtained by eliminating the upper one of the horizontal parts of the bracket shown in FIG. 8 can be also used. For convenience, a bracket like the bracket 207 shown in FIG. 8 will be called a bracket having a "double L shape in section" so as to be discriminated from a bracket having a simple L-shape in section.

In the case where external force is applied to the engine generator having the above configuration, the generator body 4 displaces in the vertical and horizontal directions in a movable range of the buffer member of the mount device 90. By the vibrations generated during the normal operation, the bump stopper 40 does not come into contact with the bump stopper receiver 60 attached to the external frame 7.

However, when large external force which is not generated during the normal operation is applied, there is a case that the generator body 4 largely shakes. At this time, first, the both ends 41c and 41d of the bump stopper 40 which are closer to the external frame 7 than the other members of the generator body 4 collide with the stopper receivers 60. By the collision, displacement of the generator body 4 is regulated, and the position is regulated to the inside of the external frame 7. Since the stopper body 41 is formed in the crank shape by providing the bent parts 41a and 41b so that the ends of the stopper body 41 are deviated from the center part only by the displacement amount Δ41, bending moment occurs in the stopper body 41 with which the ends of the stopper receiver 60 collide. Therefore, energy generated by the collision can be absorbed more than the case where the ends of a rod member having no bent parts are positioned so as to be opposed to the stopper receiver.

Since the stopper body 41 shown in the embodiment is obtained by bending a round bar having a simple shape, by changing the degree of bending of the bent part, the strength of the bump stopper 40 can be adjusted and the positional relation with neighboring members can be freely changed. At the time of changing, without changing the mold of a neighboring member or the bump stopper 40 itself, only by changing the procedure of forming process of the stopper body 41 of the bump stopper 40, a change in the weight, shape, and the like of the engine generator can be addressed. Thus, flexibility also for a change just before mass production is high.

Although the present invention has been described by the embodiment, the invention is not limited to the embodiment and modification is possible on the basis of the matters described in the scope of claims for patent and known techniques. For example, the position regulating device is not limited to an engine generator but can be widely applied to an engine operating machine in which an engine and an operating machine are surrounded by an external frame. Examples of the engine operating machine include not only a power generator but also a water pump driven by an engine and a high-pressure washing machine for pressure-feeding water by a water pump.

Attachment of the bump stopper 40 is not limited to the bosses 31 and 32 on the sides of the engine 2. In short, the bump stopper 40 may be attached to a member having high rigidity, that is, a member which is thick or reinforced by a stay or rib in an upper part (upper half) of the generator body 4. For example, in addition to the engine 2, the generator 3 has a thick block made of aluminum, so that the bump stopper 40 may be fixed to the block.

The bosses 31 and 32 corresponding to the collars 48 and 49 of the bump stopper 40 may not be dedicated to attach the bump stopper 40. For the engine 2 and the generator 3, bosses and bolt holes for attaching peripheral parts are provided. The bosses and bolt holes are provided while varying their positions so as to be adapted to models and specifications such as destinations. However, since it is unpreferable to change the type of a block housing an engine and a generator for each of models, destinations, and the like, there is a case that a number of bosses and bolt holes are provided, a part of them is used as necessary, and bosses and bolt holes which are not used exist. Consequently, for attachment of the bump stopper 40, such existing bosses and bolt holes which are not used may be used. In the case of using the bosses and bolt holes which are not used, the bump stopper 40 is not always horizontally mounted. However, when the bump stopper 40 is almost horizontal, it functions as the position regulating device.

The stopper body 41 of the bump stopper 40 is not limited to a round bar whose cross section is a perfect circle but may be a member obtained by chamfering a round bar in the longitudinal direction to make the cross section a polygonal shape, that is, a square bar. However, since the directions in which the square bar can be easily bent are limited, the round bar is more preferable.

REFERENCE SIGNS LIST

1 . . . engine generator
2 . . . engine
3 . . . generator
4 . . . generator body
5 . . . operation box
6 . . . fuel tank
7 . . . external frame
9 . . . lower beams
10 . . . upper beams
11 . . . perpendicular beams
17 . . . muffler
20 . . . air intake port
26, 27 . . . exhaust ports
28 . . . air cleaner
31, 32 . . . boss
40 . . . bump stopper
41 . . . bump stopper body (bar member)
42, 43 . . . stay
48, 49 . . . collar
60 . . . bump stopper receiver (receiving plate)
61 . . . horizontal part
62, 63 . . . vertical part

The invention claimed is:

1. A position regulating apparatus for an engine operating machine having an operating machine body made of an engine and an operating machine driven by the engine, and an external frame surrounding the periphery of the operating machine body, comprising:
   a rod member shaped in single and in long body and attached to the operating machine body and disposed so that its ends project from the periphery of the operating machine body; and a first receiving plate and a second receiving plate, attached to the external frame to regulate position in a horizontal direction of the operating machine body in a preset range, the first and second receiving plates are each disposed so as to face a different one of two end faces of the rod member with an interval corresponding to the range, wherein the rod member has a crank shape having a stopper body and bent parts provided in positions deviated to the both ends from a center of the stopper body, wherein the ends of the rod member are formed such that linear portions of respective ends are parallel with a linear portion of the stopper body of the rod member, wherein the linear portion of the stopper body of the rod member is formed between respective bent parts of the rod member and respective bent parts are formed between respective ends of the rod member, wherein the crank shape of the rod member is formed such that linear portions of respective ends are offset from the linear portion of the stopper body by a deviation in a vertical direction, wherein the stopper body of the rod member is rod-shaped and the rod member is round bar shaped, wherein respective lengths of linear portions of respective bent parts of the rod member are shorter than respective lengths of linear portions of respective ends of the rod member, and wherein linear portions of respective ends are offset from the linear portion of the stopper body in a direction parallel with the horizontal direction of the operating machine body.

2. The position regulating apparatus for an engine operating machine according to claim 1, wherein the rod member is disposed horizontally.

3. The position regulating apparatus for an engine operating machine according to claim 1, wherein the first and second receiving plates each have a vertical part opposed to said different one of two end faces of the rod member and horizontal parts orthogonal to the vertical part.

4. The position regulating apparatus for an engine operating machine according to claim 1, wherein the operating machine is a generator driven by the engine, and the rod member is fixed to an engine block of the engine.

5. The position regulating apparatus for an engine operating machine according to claim 2, wherein the operating machine is a generator driven by the engine, and the rod member is fixed to an engine block of the engine.

6. The position regulating apparatus for an engine operating machine according to claim 3, wherein the operating machine is a generator driven by the engine, and the rod member is fixed to an engine block of the engine.

7. The position regulating apparatus for an engine operating machine according to claim 1, further comprising stays joined to the rod member, wherein an engine block of the engine is provided with bosses and, by coupling the stays to the bosses, the rod member is fixed to the engine.

8. The position regulating apparatus for an engine operating machine according to claim 2, further comprising stays joined to the rod member, wherein an engine block of the engine is provided with bosses and, by coupling the stays to the bosses, the rod member is fixed to the engine.

9. The position regulating apparatus for an engine operating machine according to claim 3, further comprising stays joined to the rod member, wherein an engine block of the engine is provided with bosses and, by coupling the stays to the bosses, the rod member is fixed to the engine.

10. The position regulating apparatus for an engine operating machine according to claim 4, further comprising stays joined to the rod member, wherein the engine block of the engine is provided with bosses and, by coupling the stays to the bosses, the rod member is fixed to the engine.

11. The position regulating apparatus for an engine operating machine according to claim 2, wherein the first and second receiving plates each have a vertical part opposed to said different one of two end faces of the rod member and horizontal parts orthogonal to the vertical part.

12. The position regulating apparatus for an engine operating machine according to claim 3, wherein the operating machine is a generator driven by the engine, and the rod member is fixed to an engine block of the engine.

13. The position regulating apparatus for an engine operating machine according to claim 3, further comprising stays joined to the rod member, wherein an engine block of the engine is provided with bosses and, by coupling the stays to the bosses, the rod member is fixed to the engine.

14. The position regulating apparatus for an engine operating machine according to claim 1, wherein the first and second receiving plates are disposed at a position laterally outside of the ends of the rod member in the horizontal direction with respect to the center of the stopper body.

15. The position regulating apparatus for an engine operating machine according to claim 1, wherein respective ends of the rod member come into at least momentary contact with one or more of the first and second receiving plates during horizontal oscillation of the operating machine body.

* * * * *